United States Patent [19]
Tsay

[11] Patent Number: 5,905,322
[45] Date of Patent: May 18, 1999

[54] COIL STRUCTURE FOR ADJUSTING THE SPEED OF CEILING FAN MOTORS

[75] Inventor: Daniel Tsay, Taichung Hsien, Taiwan

[73] Assignee: Frank Hsieh, Taichung Hsien, Taiwan

[21] Appl. No.: 08/826,187

[22] Filed: Mar. 27, 1997

[51] Int. Cl.⁶ ........................... H02K 15/085; H02K 3/12
[52] U.S. Cl. ........................... 310/184; 310/180; 318/529
[58] Field of Search ............................ 310/42, 180, 184, 310/198, 202, 208; 29/596, 598; 318/523, 529

[56] References Cited

U.S. PATENT DOCUMENTS 4,619,040  10/1986  Wang et al. ........................... 29/596

Primary Examiner—Nestor Ramirez
Assistant Examiner—Judson H. Jones
Attorney, Agent, or Firm—Pro-Techtor International Services

[57] ABSTRACT

A spread adjusting motor for a ceiling fan with coils that distribute an even magnetic field for the fan rotor to eliminate the interval noises from the current. The main feature of the coils is that they use a skip or pass through winding process for the stator coils. The first step is to wind the starter coil continuously for two full slots and then skip two slots until a full round of winding upon the stator is completed. A similar skip winding process is used for each of the speed adjusting coils. Each of the speed coils is wound one full slot after skipping three slots until a full round of winding upon the stator is completed. When the skip winding process is done, the coils are evenly distributed around the stator.

3 Claims, 6 Drawing Sheets

COIL STRUCTURE FOR ADJUSTING THE SPEED OF CEILING FAN MOTORS

BACKGROUND OF THE INVENTION

The present invention relates to a motor coil means, and more specifically is a coil structure for adjusting the speed of ceiling fan motors.

It is known that existing motor coil means for adjusting the speed of ceiling fans are formed by subdivided branch circuits from a single coil series for changing the resistance or voltage. Such subdivided branch circuits cannot distribute an even magnetic field, and therefore produce unpleasant interval noises from the current. In order to overcome this defect, an improved coil means is provided for adjusting the speed of ceiling fan motors.

The primary objective of the coil means of the present invention is to distribute an even magnetic field for the fan rotor to eliminate the interval noises from the current.

The main feature of the coil means of the present invention is to use a skip or pass-through winding process for respective stator coils (Sc, Rc 1, and Rc 2). The first step is to wind the starter coil (Sc) continuously for two full slots and then skip two slots until a full round of winding upon the stator is completed. A similar skip winding process is used for each of the speed adjusting coil means (Rc 2 and Rc 1). Each of the speed coil means is wound one full slot after skipping three slots until a full round of winding upon the stator is completed. When the skip winding process is done, the coil means (Sc, Rc 2, and Rc 1) are evenly distributed around the stator.

DESCRIPTION OF THE PREFERRED EMBODIMENTS

Figure 1:
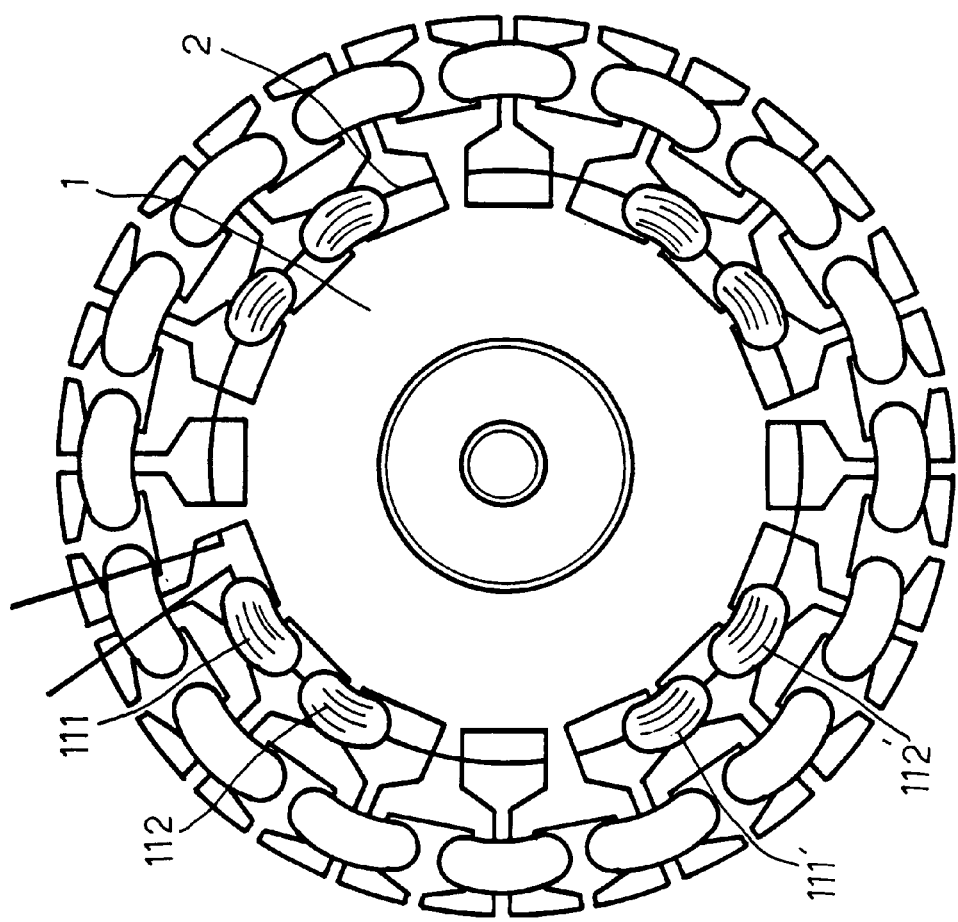
FIG. 1 is a top view of a starter coil means (Sc) of the present invention.
Figure 2:
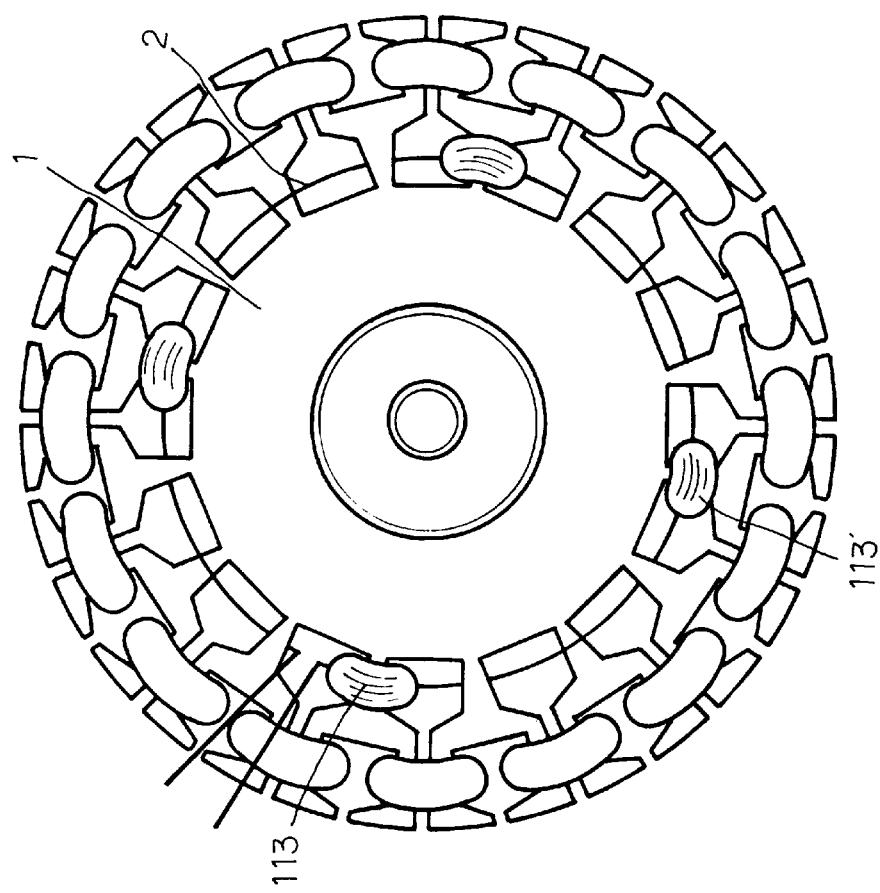
FIG. 2 is a top view of a speed adjusting coil means (Rc 2) of the present invention.
Figure 3:
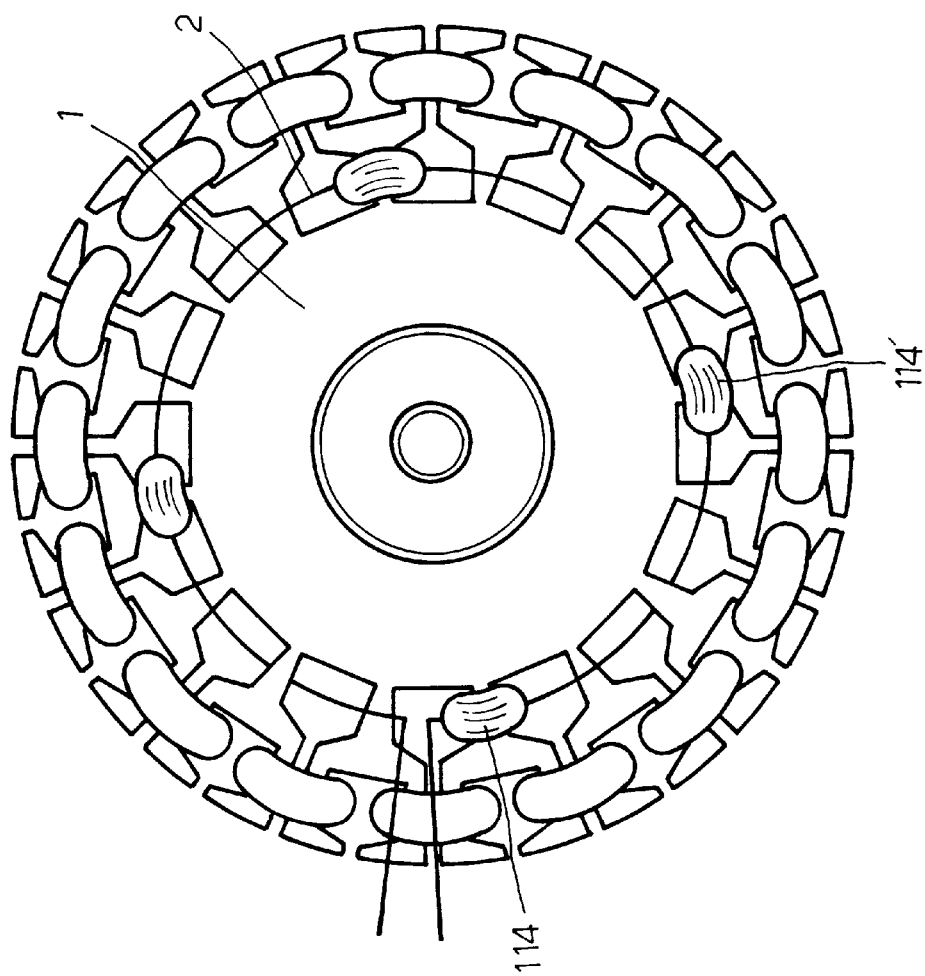
FIG. 3 is a top view of a speed adjusting coil means (Rc 1) of the present invention.

The embodiment shown in FIG. 1 is an example of a three-speed coil means (SC, Rc 2 and Rc 1) wound in a total of sixteen slots around a stator (1), in which coil means (Sc) serves as a starter coil. But the embodiment is applicable to other preferred adjustable speeds so far as the skip winding process is involved.

Figure 4:
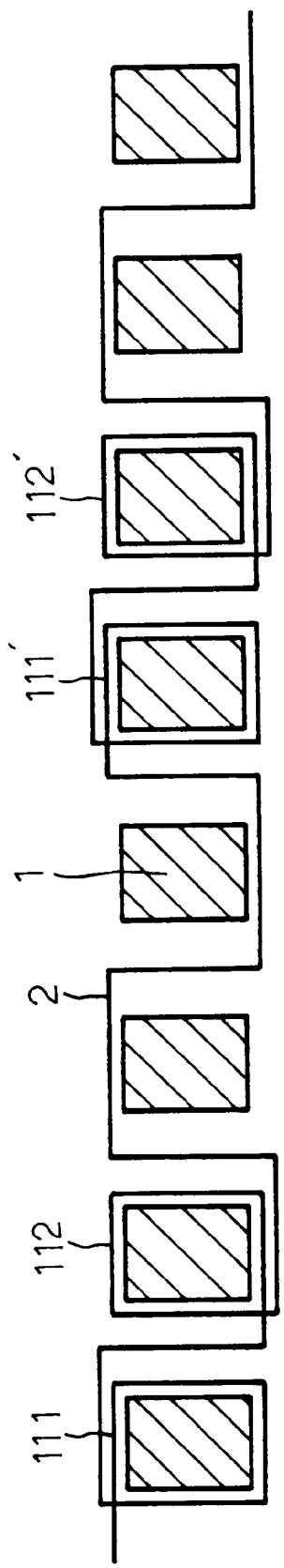
FIG. 4 is a layout view of a starter coil (Sc) route of the present invention.

Referring to FIGS. I and 4 for the starter coil (Sc), the wire (2) is wound for two consecutive slots (111, 112). The next two slots are skipped, and then two more slots (111', 112') are wound. This skip winding process is repeated until a full round of winding on the stator (1) is done. The starter coil means (Sc) is therefore evenly distributed around the stator (1). But it must be noted that if the slot (111) is wound clockwise, slot (112) must be wound counterclockwise and the following winding and skip through path must repeat the same clockwise and counterclockwise sequence as shown in FIG. 4 until a full round of winding upon the stator (1) is done.

Figure 5:
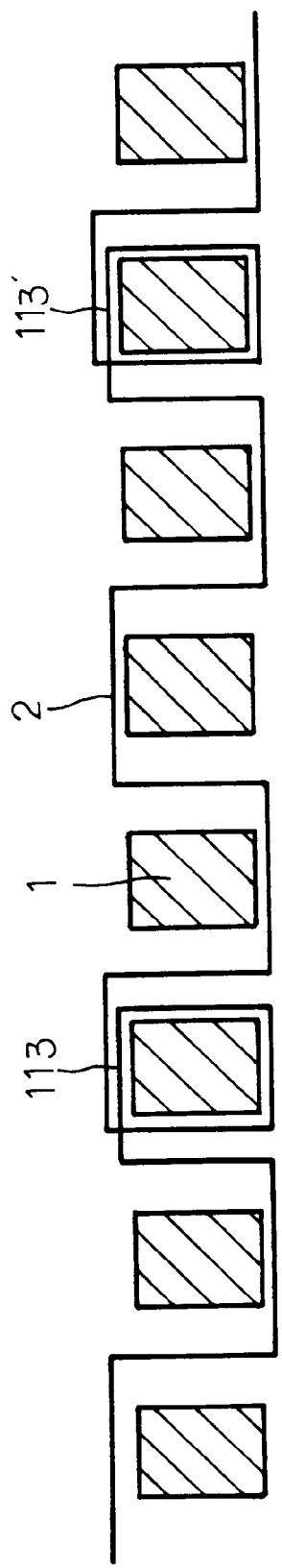
FIG. 5 is a layout view of a speed adjusting coil (Rc 2) route of the present invention.
Figure 6:
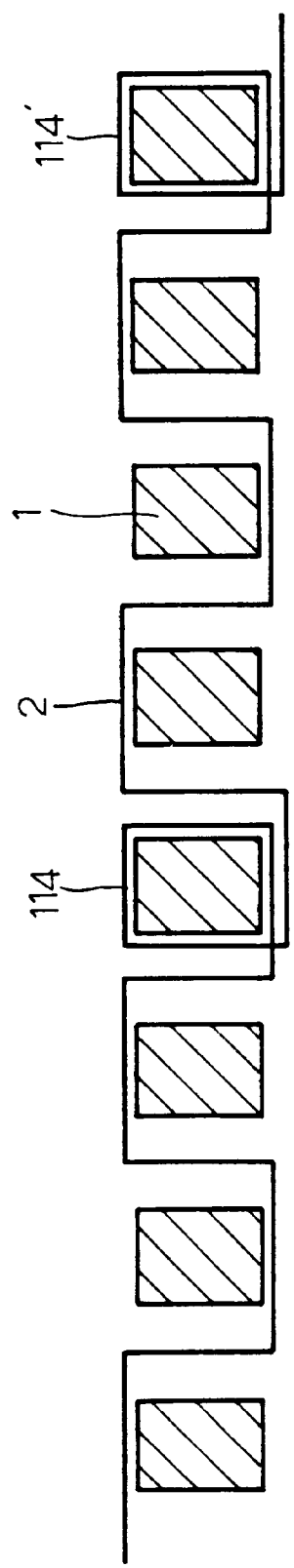
FIG. 6 is a layout view of another speed adjusting coil (Rc 1) route of the present invention.

Referring now to FIGS. 2, 3, 5, and 6, for the speed adjusting coil means (Rc 2 and Rc 1), each coil means (Rc 2, Rc 1) is wound separately for one full slot (113, 114). Then three slots are skipped, and a fourth slot (113', 114') is wound. The process is repeated until a full round of winding upon the stator (1) is done. Accordingly, each of the coil means (Rc 2, Rc 1) is evenly distributed around the stator (1). Again it must be further noted that if either slot (113, 114) is first wound clockwise (or counterclockwise), the succeeding winding must also be clockwise (or counterclockwise) to maintain the sequence as shown in FIGS. 5 and 6 until a full round of winding upon the stator (1) is done.

As a result of the coil means (Sc, Rc 2, and Rc 1) being separately wound and evenly distributed around the stator (1) by passing through one another, each coil means can distribute an even magnetic field independently to drive the fan rotor without producing internal noises at medium and low speeds.

The embodiment as illustrated above is just one example using a ceiling fan motor with three adjustable speeds, and using an internal rotor and an external stator. The same skip through winding process to evenly distribute respective coil means is applicable to four, five, six, and more adjustable speeds once the required slots are available and are wound with appropriate coil means. Also the coil means for the external stator is applicable to an internal stator if the skip through winding process is used.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A coil structure for adjusting the speed of a ceiling fan motor comprising:

a plurality of coil means separately wound and evenly distributed around a stator by a skip-through winding process, said coil means comprise at least a starter coil, a first speed adjusting coil, and a second speed adjusting coil, wherein said coil means evenly distribute magnetic fields to eliminate interval noises from an electrical current powering the fan motor.

2. The coil structure for adjusting the speed of a ceiling fan motor as claimed in claim 1 wherein:

said starter coil means is wound with two full slots followed by two skipped slots until a full round of a winding process is completed on said stator, said speed adjusting coils are being wound with one full slot followed by three skipped slots until a full round of a winding process is completed on said stator, said coil means therefore being evenly distributed around said stator.

3. The coil structure for adjusting the speed of a ceiling fan motor as claimed in claim 1 wherein:

said coil means include at least three speed adjusting coils.

* * * * *